United States Patent
Topliss et al.

(10) Patent No.: US 8,593,568 B2
(45) Date of Patent: Nov. 26, 2013

(54) SHAPE MEMORY ALLOY ACTUATION APPARATUS

(75) Inventors: Richard Topliss, Cambridge (GB); Dominic George Webber, Cambridge (GB)

(73) Assignee: Cambridge Mechatronics Limited, Cambridge (GB)

( * ) Notice: Subject to any disclaimer, the term of this patent is extended or adjusted under 35 U.S.C. 154(b) by 337 days.

(21) Appl. No.: 12/740,488

(22) PCT Filed: Oct. 30, 2008

(86) PCT No.: PCT/GB2008/003657
§ 371 (c)(1),
(2), (4) Date: May 5, 2010

(87) PCT Pub. No.: WO2009/056822
PCT Pub. Date: May 7, 2009

(65) Prior Publication Data
US 2010/0283887 A1 Nov. 11, 2010

(30) Foreign Application Priority Data

Oct. 30, 2007 (GB) .................................. 0721268.1
Mar. 18, 2008 (GB) .................................. 0805051.0

(51) Int. Cl.
*H04N 5/225* (2006.01)
(52) U.S. Cl.
USPC ...... 348/374; 348/345; 348/202; 348/208.11; 348/360; 348/335; 348/373; 348/376; 348/375; 396/73; 396/75; 396/90; 396/133; 396/354
(58) Field of Classification Search
USPC .................... 348/345, 202, 208.11, 360, 335, 348/373–376; 396/73, 75, 90, 133, 354
See application file for complete search history.

(56) References Cited

U.S. PATENT DOCUMENTS

| 4,977,886 | A | 12/1990 | Takehana et al. |
| 5,150,702 | A | 9/1992 | Miyanaga et al. |
| 5,459,544 | A | 10/1995 | Emura |

(Continued)

FOREIGN PATENT DOCUMENTS

| EP | 0 841 510 A1 | 5/1998 |
| EP | 1 626 177 A1 | 2/2006 |

(Continued)

OTHER PUBLICATIONS

U.S. Appl. No. 12/745,784, filed Jun. 2, 2010.

(Continued)

*Primary Examiner* — Antoinette Spinks
(74) *Attorney, Agent, or Firm* — Nixon & Vanderhye P.C.

(57) ABSTRACT

A shape memory alloy actuation apparatus comprises a movable element supported on a support structure by a suspension system comprising a plurality of resilient flexures. A shape memory alloy actuator drives movement of the movable element on contraction. An end-stop limits the movement of the movable element in the opposite direction. Rather than using the resilient flexures of the suspension system as the sole biasing means, an additional Massing element biasses the movable element against the SMA actuator. When the moveable element is held against the end-stop, the force applied by the biassing element is greater than the force applied by the flexures of the suspension system. This reduces the design constraints, for example allowing a greater range of movement.

18 Claims, 9 Drawing Sheets

(56) References Cited

U.S. PATENT DOCUMENTS

| | | | |
|---|---|---|---|
| 5,763,979 A | 6/1998 | Mukherjee et al. | |
| 6,157,779 A | 12/2000 | Kosaka et al. | |
| 6,307,678 B2 | 10/2001 | Kosaka et al. | |
| 6,434,333 B2 | 8/2002 | Tanaka et al. | |
| 6,434,932 B2 | 8/2002 | Hara et al. | |
| 6,449,434 B1 | 9/2002 | Fuss | |
| 6,516,146 B1 | 2/2003 | Kosaka | |
| 6,554,501 B2 | 4/2003 | Kosaka et al. | |
| 6,574,958 B1 | 6/2003 | MacGregor | |
| 6,833,656 B2 | 12/2004 | Hooley et al. | |
| 6,945,045 B2 | 9/2005 | Hara et al. | |
| 7,068,930 B2 | 6/2006 | McKevitt et al. | |
| 7,224,813 B2 | 5/2007 | Hooley et al. | |
| 7,295,389 B2 | 11/2007 | Ohtsuka et al. | |
| 8,000,044 B2 * | 8/2011 | Ono et al. | 359/824 |
| 2001/0002226 A1 | 5/2001 | Tanaka et al. | |
| 2001/0025477 A1 | 10/2001 | Hara et al. | |
| 2002/0001467 A1 | 1/2002 | Tanaka et al. | |
| 2002/0113499 A1 | 8/2002 | Von Behrens et al. | |
| 2006/0048511 A1 | 3/2006 | Everson et al. | |
| 2006/0067658 A1 | 3/2006 | Wirt | |
| 2006/0098968 A1 * | 5/2006 | Ito et al. | 396/85 |
| 2006/0109570 A1 | 5/2006 | Ohtsuka et al. | |
| 2006/0120708 A1 | 6/2006 | Kosaka et al. | |
| 2006/0150627 A1 | 7/2006 | Oohara | |
| 2006/0185359 A1 | 8/2006 | Hamaguchi et al. | |
| 2006/0209195 A1 | 9/2006 | Goto | |
| 2006/0266031 A1 | 11/2006 | Kosaka et al. | |
| 2006/0272328 A1 | 12/2006 | Hara et al. | |
| 2007/0047938 A1 | 3/2007 | Suzuki et al. | |
| 2007/0058070 A1 | 3/2007 | Chen | |
| 2007/0280668 A1 * | 12/2007 | Kubo et al. | 396/133 |
| 2007/0294873 A1 | 12/2007 | Bogursky et al. | |
| 2008/0158412 A1 | 7/2008 | Tagome et al. | |
| 2008/0278030 A1 | 11/2008 | Hara et al. | |
| 2008/0278590 A1 | 11/2008 | Tanimura et al. | |
| 2008/0282696 A1 | 11/2008 | Wada et al. | |
| 2009/0295986 A1 * | 12/2009 | Topliss et al. | 348/374 |
| 2010/0060776 A1 | 3/2010 | Topliss et al. | |
| 2010/0074607 A1 | 3/2010 | Topliss et al. | |
| 2010/0074608 A1 | 3/2010 | Topliss | |
| 2010/0275592 A1 | 11/2010 | Topliss et al. | |

FOREIGN PATENT DOCUMENTS

| | | |
|---|---|---|
| EP | 1 640 757 A1 | 3/2006 |
| EP | 1 666 216 A1 | 6/2006 |
| EP | 1 914 422 A1 | 4/2008 |
| EP | 2 239 610 A1 | 10/2010 |
| GB | 2 398 854 A | 9/2004 |
| GB | 2 434 214 A | 7/2007 |
| JP | 61-229977 | 10/1986 |
| JP | 9-127398 | 5/1997 |
| JP | 2002-99019 | 4/2002 |
| JP | 2002-130114 | 5/2002 |
| JP | 2004-38058 | 2/2004 |
| JP | 2004-212882 | 7/2004 |
| JP | 2004-333995 | 11/2004 |
| JP | 2005-195998 | 7/2005 |
| JP | 2005-275270 | 10/2005 |
| JP | 2006-330542 | 12/2006 |
| JP | 2007-060530 A | 3/2007 |
| JP | 2007-078954 | 3/2007 |
| JP | 2007078954 A * | 3/2007 |
| JP | 2007-315352 | 12/2007 |
| JP | 2009-122602 A | 6/2009 |
| WO | WO 94/19051 | 9/1994 |
| WO | WO 01/47041 | 6/2001 |
| WO | WO 02/103451 | 12/2002 |
| WO | WO 03/048831 A2 | 6/2003 |
| WO | WO 2005/003834 A1 | 1/2005 |
| WO | WO 2005/026539 A2 | 3/2005 |
| WO | WO 2005/075823 A1 | 8/2005 |
| WO | WO 2005/093510 A2 | 10/2005 |
| WO | WO 2006/054535 | 5/2006 |
| WO | WO 2006/059098 A1 | 6/2006 |
| WO | WO 2006/061623 A1 | 6/2006 |
| WO | WO 2006/105588 | 10/2006 |
| WO | WO 2006/126545 | 11/2006 |
| WO | WO 2007/018086 A1 | 2/2007 |
| WO | WO 2007/113478 A1 | 10/2007 |
| WO | WO 2007113478 A1 * | 10/2007 |
| WO | WO 2008/099155 | 8/2008 |
| WO | WO 2008/099156 | 8/2008 |
| WO | WO 2008/129290 A1 | 10/2008 |
| WO | WO 2008/129291 A2 | 10/2008 |
| WO | WO 2009/096207 A1 | 8/2009 |

OTHER PUBLICATIONS

International Search Report for PCT/GB2007/001050 mailed Aug. 30, 2007.
Written Opinion of the International Searching Authority for PCT/GB2007/001050 mailed Aug. 30, 2007.
International Search Report for PCT/GB2008/000478, mailed Sep. 24, 2008.
Written Opinion of the International Searching Authority for PCT/GB2008/000478, mailed Sep. 24, 2008.
U.S. Appl. No. 13/056,928, filed Apr. 11, 2011.
International Search Report for PCT/GB2009/001853 mailed Mar. 29, 2011.

* cited by examiner

SHAPE MEMORY ALLOY ACTUATION APPARATUS

This application is the U.S. national phase of International Application No. PCT/GB2008/003657 filed 28 Oct. 2008, which designated the U.S. and claims priority to GB Application No. 0721268.1, filed 30 Oct. 2007, and GB Application No. 0805051.0 filed 18 Mar. 2008, the entire contents of each of which are hereby incorporated by reference.

The present invention relates to a shape memory alloy (SMA) actuation apparatus using SMA material as an actuator to drive movement of a movable element.

The present invention is generally applicable to any type of movable element but has particular application to actuation of a camera lens element, for example of the type used in a miniature camera which may be employed in a portable electronic device such as a mobile telephone or a mobile digital data processing and/or transmitting device. In recent years, with the explosive spread of portable information terminals sometimes known as PDAs (portable digital assistants) and portable telephones, an increasing number of devices incorporate a compact digital camera apparatus employing an image sensor. When such a digital camera apparatus is miniaturized using an image sensor with a relatively small image-sensing area, its optical system, including one or more lenses, also needs to be miniaturized accordingly.

To achieve focusing or zooming, an actuation arrangement of some type must be included in the confined volume of such a miniature camera to drive movement of the camera lens element along the optical axis. As the camera lens element is small, the actuation arrangement must be capable of providing precise actuation over a correspondingly small range of movement. At the same time it is desired that the actuator arrangement is itself compact given the desire for miniaturization of the camera apparatus as a whole. In practical terms, these points limit the types of actuation arrangement which can be applied.

Whilst most of the existing cameras rely on variations of the well-known electric-coil motor, a number of other actuation arrangements have been proposed as small drive units for the lens system. Such other actuation arrangements may include transducers based on piezoelectric, electrostrictive or magnetostrictive material, commonly referred to as electro-active devices and one example is an actuator comprising a curved structure of helically coiled piezoelectric bender tape as disclosed in WO-01/47041 which may be used as an actuator for a camera lens as described in WO-02/103451.

Another type of actuation arrangement which has been proposed uses SMA material as an actuator. The SMA actuator is arranged on heating to drive movement of the camera lens element. Actuation may be achieved by control of the temperature of the SMA actuator over an active temperature range in which the SMA actuator changes between martensite and austenite phases in which the stress and strain of the SMA actuator changes. At low temperatures the SMA actuator is in the martensite phase, whereas at high temperatures the SMA actuator transforms into the austenite phase which induces a deformation causing the SMA actuator to contract. The temperature of the SMA actuator may be changed by selectively passing a current through the SMA actuator to heat it causing the phase change. The phase change occurs over a range of temperature due to the statistical spread of transition temperature in the SMA crystal structure. The SMA actuator is arranged so that the contraction drives movement of the movable element. Conventionally a biassing means provides a bias force in an opposite direction from the force applied by the SMA actuator on contraction.

The use of SMA material as an actuator for a small object such as a camera lens element of a miniature camera provides the advantages of being intrinsically linear, providing a high power per unit mass, being a low cost commodity item and being a relatively small component.

It is also necessary to consider the suspension system that suspends the movable element and guides movement along a movement axis. For precision applications, the movement must suffer a minimum of deviance from the nominal movement axis over the range of movement and when the apparatus orientated in different positions. The deviance may be in the form of a relative angular tilt and/or linear translation of the axes. This is particularly true for a camera lens element for which these deviances may cause a degradation of image quality. Thus the suspension system ideally has a low stiffness or resistive force in the direction of the desired motion and high stiffness in all other directions.

The present invention concerns a suspension system comprising a plurality of resilient flexures. These may be coupled between the support structure and the movable element to support the movable element on the support structure and to guide movement of the movable element along a movement axis by deflection of the flexures. Flexures provide numerous benefits as a suspension system. The flexures may be arranged to provide a low stiffness along the movement axis and a high stiffness perpendicular to the movement axis. Similarly, flexures experience a minimal degree of friction against movement, as compared for example to a bearing. Lastly, a suspension system formed by flexures is compact and straightforward to manufacture.

WO-2007/113478 discloses an example of an SMA actuation apparatus in which the movable element is a camera lens element supported by a suspension system comprising a plurality of flexures.

The present invention is concerned with designing such an apparatus to provide a desired range of movement. There are various variables and constraints, including the arrangement and properties of the SMA material, and the arrangement and properties of the flexures of the suspension system.

Where a suspension system comprises a plurality of flexures, a perceived advantage is that the flexures also act as a biassing means providing a bias force in an opposite direction from the force applied by the SMA actuator on contraction. Desirably, the apparatus is configured to require a relatively high stress to be developed in the SMA actuator to move the movable element away from the rest position in which the SMA actuator is unactivated. This may be achieved by means of providing an end-stop which limits the movement of the movable element in direction opposite to the direction of movement driven by contraction. The end-stop is positioned to pre-stress the biassing means, which stress must be overcome by the SMA actuator on activation to generate movement.

Such pre-stress is desirable for a number of reasons. Firstly this raises the temperature at which the stress in the SMA material is sufficient to cause contraction against the biassing means. This is desirable to increase the range of ambient temperatures at which the apparatus is usable. Secondly, in the rest state, the pre-stressing of the biassing means holds the movable element firmly against the end-stop. This is desirable to precisely control the position and prevent movement of the movable element caused by external forces.

However, such pre-stressing needs to be balanced against over design constraints, notably the range of movement achievable. The maximum movement achievable is constrained by the need to avoid a degree of deflection of the flexures which causes the material limits of the flexures to be exceeded.

The pre-stressing can be increased by moving the position of the end-stop. However, this directly reduces the range of movement.

The pre-stressing can also be increased by increasing the stiffness of the flexures. This increases the pre-stress force in the rest state. However, on deflection of the flexures it also causes the material limits of the flexures to be approached more quickly and so can indirectly reduce the range of movement.

In practice, the apparatus is designed to balance these various constraints. Such design is a straightforward task to perform, but it would be desirable to minimise the constraints discussed above in order to provide an apparatus having improved properties, for example a greater range of movement or a less constrained design of the flexures of the suspension system.

According to the present invention, there is provided a shape memory alloy actuation apparatus comprising:
   a support structure;
   a movable element;
   a suspension system comprising a plurality of resilient flexures coupled between the support structure and the movable element to support the movable element on the support structure and to guide movement of the movable element along a movement axis by deflection of the flexures;
   a shape memory alloy actuator arranged to drive movement of the movable element relative to the support structure in a first direction along the movement axis, on contraction of the shape memory alloy actuator;
   an end-stop arranged to limit the movement of the movable element in a second direction along the movement axis, opposite to the first direction;
   a biassing element arranged to bias the movable element relative to the support structure in the second direction along the movement axis, the apparatus being arranged such that, when the moveable element is held against the end-stop, the force applied by the biassing element in said second direction is greater than the force applied by the resilient flexures of the suspension system.

Thus the present invention involves providing a biassing element in addition to the suspension system comprising a plurality of resilient flexures. This is contrary to the expectation, for example as taught in WO-2007/113478, that a suspension system comprising a plurality of resilient flexures has the benefit of itself acting as the biassing means. However, it has been appreciated that in fact there are benefits in providing an additional biassing element with a an arrangement in which, when the moveable element is held against the end-stop, the force applied by the biassing element is greater than the force applied by the flexures of the suspension system.

In particular, the additional biassing element provides the benefit of providing a relatively high pre-stress. That is, the biassing element applies a relatively high force which increases the force to be developed in the SMA actuator to move the movable element away from the rest position in which the SMA actuator is unactivated. Such pre-stress has the benefits discussed above.

However, as the additional biassing element does not suspend the movable element on the support structure and guide movement along the movement axis, the constraints on the design of the additional biassing element are greatly reduced. In particular, it is significantly easier to design the additional biassing element without exceeding the material limits. For example, if the additional biassing element is a flexure, it can have a length, as measured between the positions at which it is coupled to the support structure and the movable element, which is greater than the flexures of the suspension system.

This reduces the design constraints on the apparatus as a whole, allowing an improved design. For example, as compared to an equivalent apparatus without the additional biassing element, the maximum degree of movement may be increased and/or the constraints on the design of the flexures may be relaxed.

To allow better understanding, an embodiment of the present invention will now be described by way of non-limitative example with reference to the accompanying drawings, in which.

There will first be described the structure of a camera 1 incorporating an SMA actuation apparatus. The camera 1 is to be incorporated in a portable electronic device such as a mobile telephone, media player or portable digital assistant.

Figure 1:
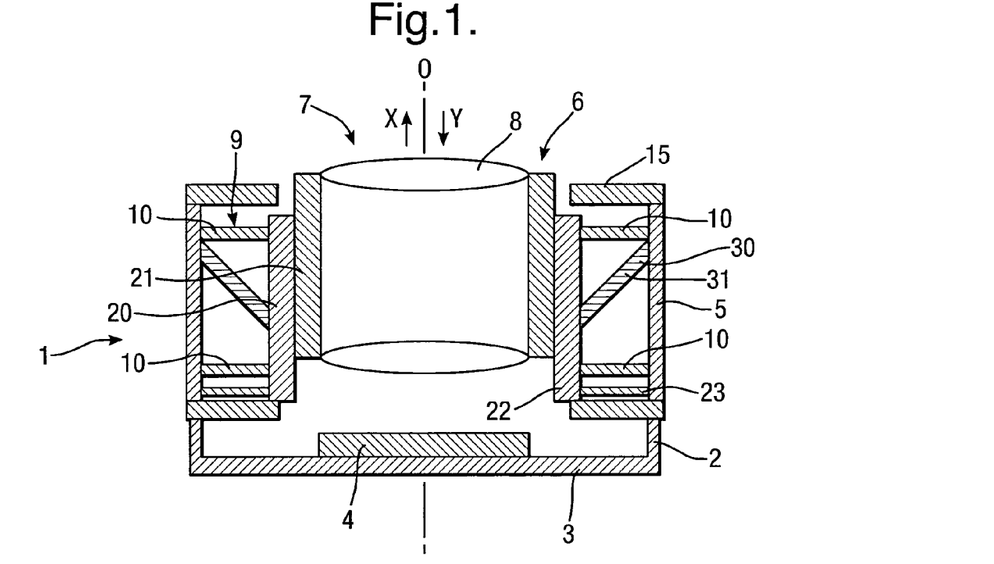
FIG. 1 is a schematic, cross-sectional view of a camera incorporating an SMA actuation apparatus.

The camera 1 is shown schematically in FIG. 1 which is a cross-sectional view, the cross-section being taken along the optical axis O of the camera 1. The camera 1 comprises a support structure 2 which has a base portion 3 on which there is mounted an image sensor 4 which may be CCD (charge-coupled device) or a CMOS (complimentary metal-oxide-semiconductor) device. The support structure 2 further comprises an annular wall 5 protruding from the front side of the base 3 on which the image sensor 4 is mounted. The support structure 2 may be made of plastic.

The camera 1 further comprises a lens element 6 which holds a lens system 7 consisting of one or more lenses 8. By way of example, the lens system 7 is shown in FIG. 1 as consisting of two lenses 8 but in general there may be a single lens 8 or plural lenses 8 as needed to provide the desired balance of optical performance and low cost. The camera 1 is a miniature camera with the lenses 8 of the lens system 7 typically having a diameter of at most 10 mm.

The lens element 6 is arranged with the optical axis O of the lens system 7 perpendicular to the image sensor 4. In this manner, the lens system 7 focuses light onto the image sensor 4.

The lens element 6 has a two-part construction comprising a lens carrier 20 and a lens holder 21 mounted inside the lens carrier 20 on an internal screw thread 22 formed inside the lens carrier 20. Typically the lens holder 21 has a diameter of 6.5 mm. The lens carrier 20 is connected to the suspension system 9 to suspend the lens element 6. The lens holder 21 mounts the one or more lenses 8 of the lens system 7. Both the lens carrier 20 and the lens holder 21 may be made from moulded plastic.

The lens element 6 is suspended on the support structure 2 by a suspension system 9 consisting of two suspension elements 10 connected between the annular wall 5 of the support structure 2 and the lens element 6. As described further below, each suspension element 10 comprises a plurality of resilient flexures 13 coupled between the support structure 2 and the lens element 6, thereby supporting the lens element 6 on the support structure 2. The resilient flexures 13 deflect to guide movement of the lens element 6 along the optical axis O whilst resisting movement of the lens element 6 perpendicular to the optical axis O. Such movement of the lens element 6 changes the focus of the image formed on the image sensor 4.

The camera 1 further comprises an SMA actuator 30 which comprises a piece of SMA wire 31 mechanically connected to the annular wall 5 of the support structure 2 and to the lens carrier 20 of the lens element 6, as described in more detail below. The SMA wire 31 is held in tension. On heating of the SMA wire 31, the SMA actuator 30 contracts, driving movement of the lens element 6 in a first direction X along the optical axis O away from the image sensor 4. The lens element 6 is shown in FIG. 1 in its rest state in which the SMA actuator 30 is not active. In this state, the lens element 6 is in its closest position to the image sensor 4 within its range of movement, this position corresponds to far-field or hyperfocal focus, which is the most common setting for the camera 1, particularly if an auto-focus function is provided.

The camera 1 further comprises a biassing element 23 coupled between the support structure 2 and the lens element 6. As described in further detail below, the biassing element 23 comprises a resilient flexure which deflects on movement of the lens element 6 along the optical axis O. The biassing element 23 is always deflected in the first direction X so that it applies a force in a second, opposite direction Y, thereby acting as a biassing means against the force applied by the SMA actuator 30.

On heating of the SMA actuator 30 the stress therein increases until it overcomes the biassing element 23 and the flexures 13. The SMA wire 31 contracts moving the lens element 6 away from the image sensor 4. The lens element 6 moves over a range of movement as the temperature of the SMA wire 31 increases over the range of temperature in which the transition of the material of the SMA wire from the Martensite phase to the Austenite. Conversely, on cooling of the SMA wire 31 so that the stress therein decreases, the biassing provided by the biassing element 23 and the flexures 13 causes the SMA wire 31 to expand moving the lens element 6 towards the image sensor 4.

The support structure 2 further comprises an upper wall 15 and a lower wall 16 protruding inwardly from the annular wall 5, outside the lens element 6. The upper wall 15 and lower wall 16 are annular so that light passing through the lens system 7 passes through the aperture therein without being obstructed. However, the upper wall 15 and lower wall 16 constitute end-stops for the lens element by overlapping the lens carrier 20 of the lens element 6 to limit movement along the optical axis O.

The lower wall 16 limits movement of the lens element 6 in the second direction Y when the lens element 6 is in its rest state in which the SMA actuator 30 is not active, as shown in FIG. 1. The position of the lower wall 16 is selected so that in this state the biassing element 23 is deflected in the first direction X so that it applies a force in the second direction Y. As the SMA actuator 30 is not active, this force holds the lens element 6 firmly in position against the lower wall 16.

The camera 1 is arranged such that the force applied by the biassing element 23 at this position is greater than the force applied by the flexures 13 of the suspension system 9. Typically, at this position the flexures 13 of the suspension system 9 are not deflected at all so they apply no force. However, in principle, the flexures 13 of the suspension system 9 could be deflected by a positive or negative amount so that they apply a negative or positive force, provided that the value of this force is less than the value of the force applied by the biassing element 23. Also, if the flexures 13 of the suspension system 9 apply a negative force (ie in the first direction X against the biassing element 23), then the magnitude of the force should be less than the magnitude of the force applied by the biassing element 23 in order to prevent the flexures 13 from driving the lens element 6 off the lower wall 16.

The upper wall 15 is positioned to provide a clearance between the upper wall 15 and the lens element 6 when the SMA actuator 30 is in its fully contracted state. Thus in normal operation the upper wall 15 does not contact the lens element 6. The upper wall 15 is provided as a safety measure, positioned to limit the maximum deflection, and hence stress, of the flexures 13 and biassing element 23 when the camera is subject to external forces, for example if the camera 1 is dropped or knocked. Thus, the position of the upper wall 15 is chosen so that when the lens element 6 is in contact with lower wall 16 the material limits (eg deformation limit and fatigue limit) of the flexures 13 of the suspension system 9 and the biassing element 23 are not exceeded.

The addition of the biassing element 23 reduces the design constraints on the camera 1 as follows.

Figure 2:
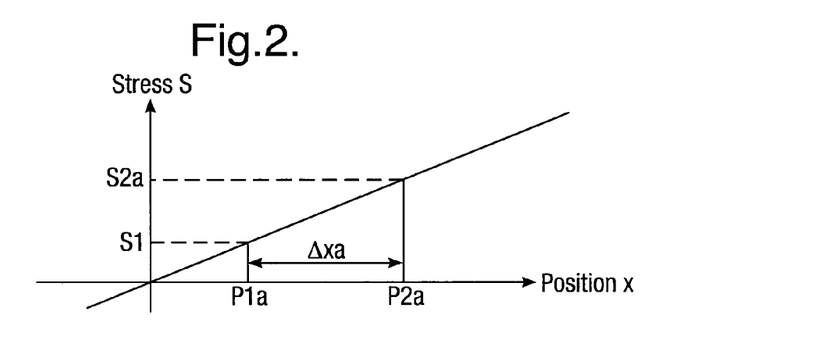
FIG. 2 is a graph of stress developed against position of a lens element in a comparative example.

By way of comparative example, FIG. 2 is a graph of the stress S developed (in the suspension system 9 and therefore also the SMA actuator 30) at different positions x of the lens element 6 in an equivalent apparatus in which the biassing element 23 is omitted, as for example in the apparatus disclosed in WO-2007/113478. The position x is measured in the first direction X. The positions P1$a$ and P2$a$ are the ends of the range of movement Δx1 of the lens element 6.

The position P1$a$ of the lower wall 16 is the position of lens element 6 in its rest state and is selected to pre-stress the suspension system 9 to a stress S1 which is therefore the stress which needs to be developed in the SMA actuator 30 to start movement of the lens element 6. This pre-stress is designed to be sufficiently high to achieve two effects. Firstly, as the pre-stress raises the temperature at which the stress in the SMA actuator 30 is sufficient to cause contraction against the biassing element 23, the pre-stress is selected to having regard to the desired range of ambient temperatures at which the camera 1 is to operate. Secondly, the pre-stress is selected to hold the lens element 6 firmly against the lower wall 16 for the purposes of precisely controlling the position and preventing movement of the lens element 6 caused by external forces.

The position P2$a$ is the position of the lens element 6 when the SMA actuator 30 is fully contracted and is therefore dependent on the configuration of the SMA actuator 30. At this position P2$a$, a stress S2 is developed. The position P2$a$ is selected so that at this position P2$a$, and indeed at the position of the upper wall 15, the material limits of the flexures 13 of the suspension system 9 are not exceeded.

Figure 3:
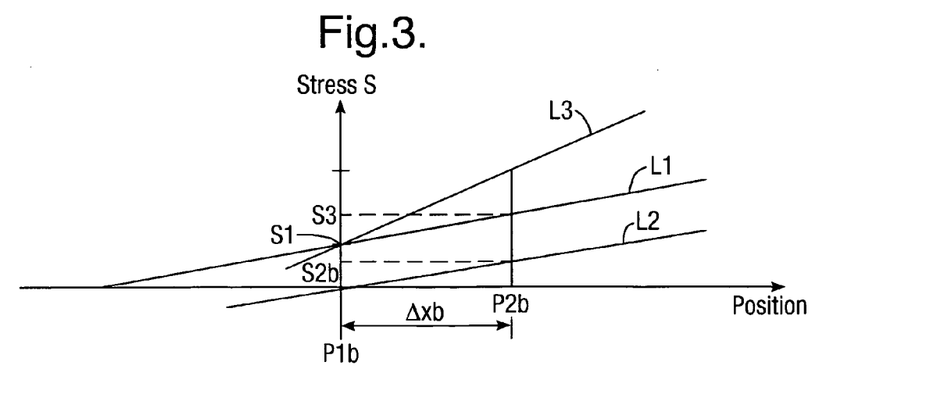
FIG. 3 is a graph of stress developed against position of the lens element in the camera of FIG. 1.

FIG. 3 shows an equivalent graph of the stress S developed at different positions x of the lens element 6 in the camera 1. In particular line L1 is the stress developed in the biassing element 23, line L2 is the stress developed in the suspension system 9, and line L3 is the total stress developed in the biassing element 23 and the suspension system 9 together which is therefore the stress developed in the SMA actuator 30. The positions P1$b$ and P2$b$ are the ends of the range of movement Δx2 of the lens element 6.

In this example, the position P1$b$ of the lower wall 16 is selected so that in the rest position of the lens element 6, the suspension system 9 is not deflected and therefore develops no stress, but the biassing element 23 develops the stress S1, having the same value as at the rest position in the comparative example of FIG. 2. This stress S1 is therefore also the stress which needs to be developed in the SMA actuator 30 to start movement of the lens element 6 and is selected on the basis described above.

The position P2$b$ is the position of the lens element 6 when the SMA actuator 30 is fully contracted and is therefore dependent on the configuration of the SMA actuator 30. The SMA actuator 30 is configured so that at this position P2$b$ and, indeed, at the position of the upper wall 15, the stress S3 developed in the biassing element 23, and the stress S2$b$ developed in the suspension system 9 do not exceed the material limits of the biassing element 23 and flexures 13 of the suspension system 9. Compared to the comparative example of FIG. 2, the constraints on the design of the flexures 10 is greatly reduced. Firstly, it is not necessary for the suspension system 9 to provide all the stiffness necessary to bias the SMA actuator 30, this being provided predominantly by the biassing element 23. Secondly, it is possible to operate the flexures 10 at lower degrees of deflection. Thus, in the specific example of FIG. 3, the camera 1 provides a higher range of movement Δx2 than the range of movement Δx1 in the comparative example of FIG. 2, whilst providing a lower stress S2$b$ in the suspension system 9 than the stress S2$a$ in the comparative example of FIG. 2.

The construction of the camera 1 will now be described in detail, with reference to FIGS. 4 to 12 which are perspective views of successively assembled components of the camera 1, in which the camera 1 is shown upside-down for convenience. A key desire for the camera 1 is to minimise size, whilst providing the largest possible diameter lens system 7 within the space available.

Figure 4:
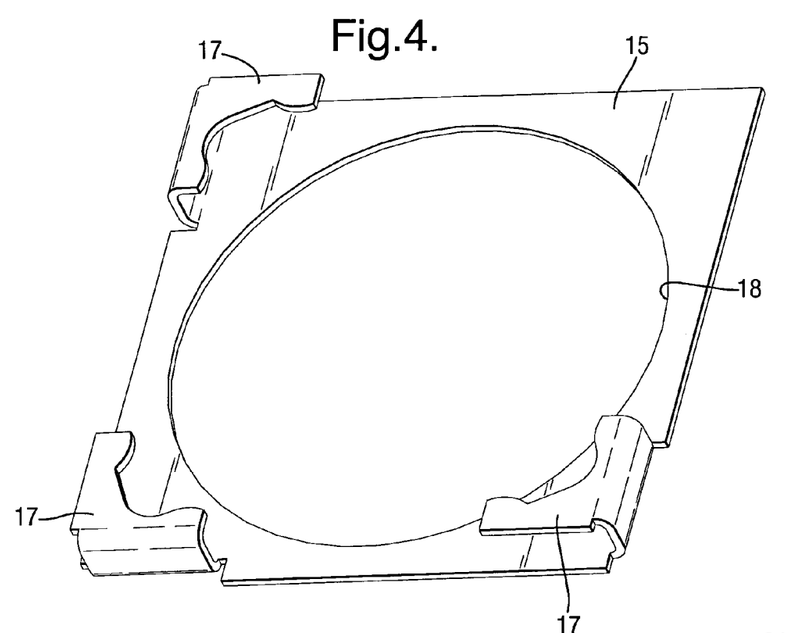
FIGS. 4 to 12 are perspective views of successively assembled components of the camera.

The upper wall 15 is shown in FIG. 4 and is formed from a metal plate having a central aperture 18 and having three mounts 17 formed by bending over portions of the metal plate.

Figure 5:
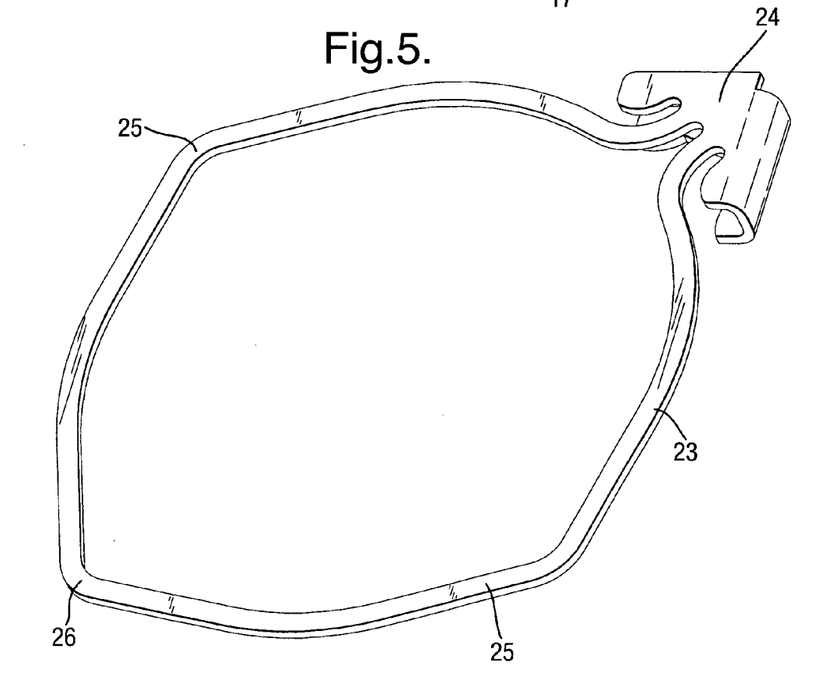
Figure 6:
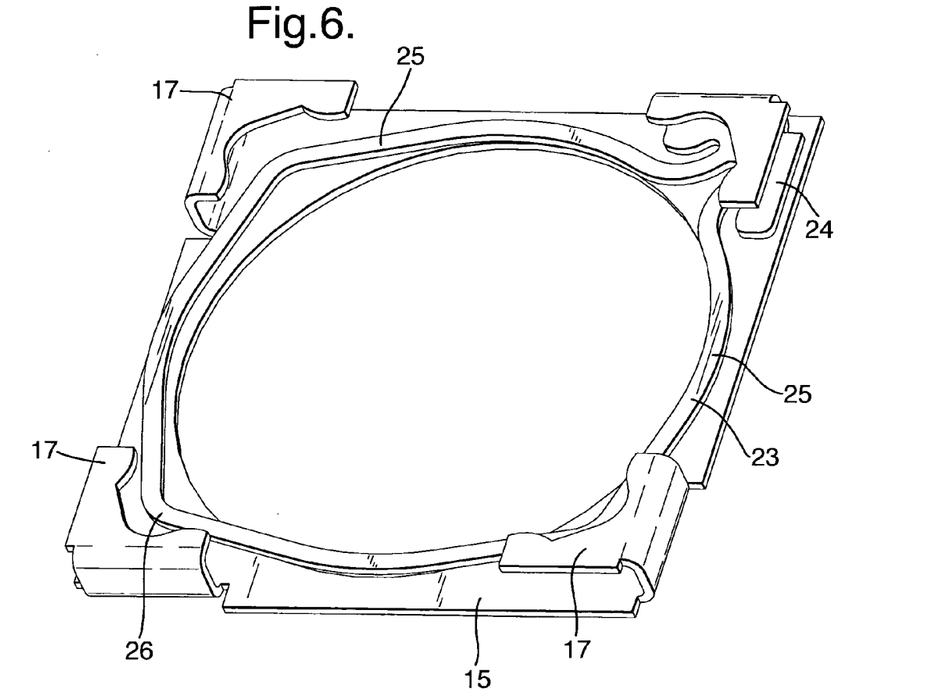

The biassing element 23 is shown in FIG. 5 and is a resilient flexure that works as a "fixed-free" cantilever beam. The biassing element 23 is formed from a respective single sheet of material such as steel or beryllium copper cut into shape. At one end, the biassing element 23 has a mount 24 by which it is mounted to the upper wall 15 as shown in FIG. 6, so that it is coupled immovably to the support structure 2, for example by laser welding.

The biassing element 23 has two arms 25 each extending from the mount 24 and joined together at their opposite ends 26 where the biassing element 23 engages the lens element 6 as described below.

The arms 24 are curved so that the biassing element 23 is annular overall. In this embodiment therefore the arms 24 each extend 180° around the optical axis O. As shown further below, the curvature of the arms 24 ensures that the arms 24 are outside the field of view of the lens element 6 to avoid obstructing imaging on the image sensor 4. In its natural position, the biassing element 23 is formed into a bent position, which is adjusted to provide the correct bias loading to the SMA actuator 30.

This form of the biassing element 23 is particularly advantageous and could equally be applied to other types of SMA actuation apparatus, including ones which employ a suspension system not using flexures.

Figure 7:
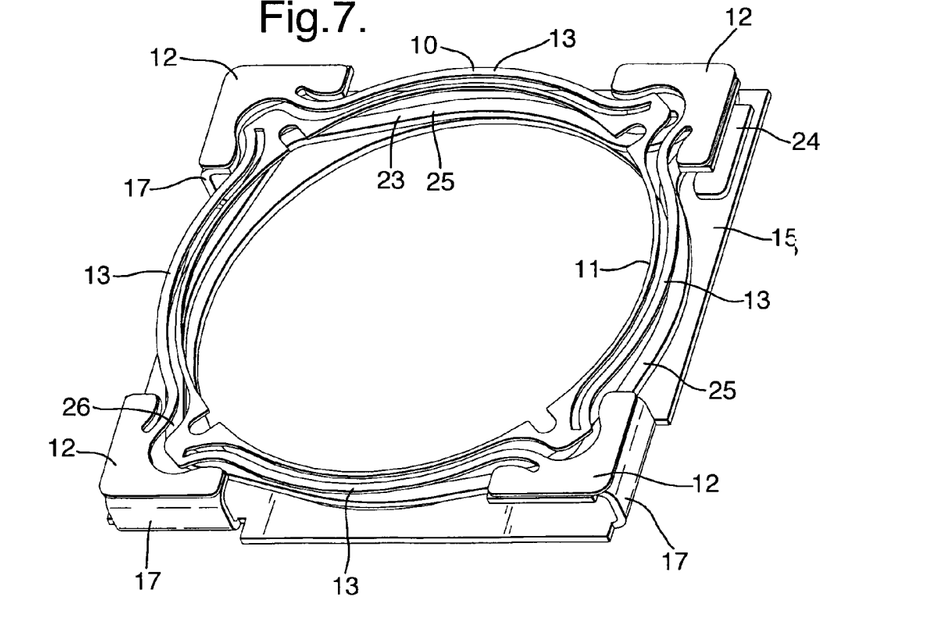

A first suspension element 10 is assembled as shown in FIG. 7. The suspension element 10 is formed from a single sheet of material such as steel or beryllium copper cut into shape. One possibility is hard rolled grade 302 austenetic steel which has the advantage of providing a high yield stress.

The suspension element 10 comprises an inner ring 11 connected to the lens carrier 20 as described further below. The ends 26 of the biassing element 23 contact the inner ring 11 and through that contact engage the lens element 6 to apply a biassing force. As the biassing element 23 is always deflected it is not necessary for the ends 26 to be fixed. This is advantageous because it allows the orientation of the ends 26 to change as the biassing element 23 deflects. This allows the biassing element 23 to undergo a greater degree of deflection than if the orientation of the ends 26 was fixed, forcing the biassing element 23 to take up an S-shaped curve on deflection. However, as an alternative, the ends 26 may be fixed to the lens element 6, preferably by a means having compliance to allow some movement of the ends 26 relative to the lens element 6, for example a blob of glue.

The suspension element 10 further comprises four mounting plates 12 positioned in four corners. The mounting plates 12 are each connected to one of the mounts 17 of the upper wall 15 or the mount 24 of the biassing element 23.

Lastly, the suspension element 10 comprises four flexures 13 which each extend between the inner ring 11 and one of the mounting plates 12. In this manner, the flexures 13 are coupled at opposite ends to the lens element 6 and the support structure 2. As viewed along the optical axis O, the flexures 13 are generally inclined relative to the direction radial of the optical axis O. Thus the flexures 13 extend around the optical axis. The flexures 13 are disposed around the lens carrier 20 at different radial positions with rotational symmetry around the optical axis O. Furthermore, the flexures 13 have a thickness along the optical axis O (that is the thickness of the sheet of material from which the suspension element 10 is made) which is smaller than their width in a direction perpendicular to the optical axis O. The suspension element 10 is designed with an appropriate number of flexures 13 of appropriate width, thickness and length to provide the desired degree of stiffness along the optical axis O and perpendicular thereto. The flexures 13 typically have a thickness in the range from 25 m to 100 m. The number of flexures 13 may be changed by varying the number of flexures 13 within a suspension element 10 and/or by providing additional suspension elements 10.

The flexures 13 are also curved along their length as viewed along the optical axis O
with three regions of alternating curvature. By introducing such curvature to the flexures 13, a degree of strain relief is added to the structure. The tendency of the flexures 13 to plastically deform is reduced and instead the flexures 13 have a tendency to bend elastically. By introducing the outer regions having opposite curvature to the central region, the force imbalance is reduced and the stress developed at the joints with the inner ring 11 and mounting plates 12 are reduced. Thus the flexures 13 become more compliant in the planar direction without experiencing material failure. This is achieved without an unacceptable compromise to the radial and axial stiffnesses. This allows the suspension system 9 to accommodate the displacement of the lens element 6 radially of the optical axis O caused by mechanical impacts without causing permanent damage to the flexures 13. To limit the displacement in this direction, the camera 1 is provided with a small clearance, for example of the order of 50 m or less, between the lens element 6 and the wall 5 of the support structure 2 so that the wall 5 of the support structure 2 acts as a stop to limit the maximum displacement.

To maximize this effect the three regions of the flexures 13 preferably have unequal lengths and curvature, in particular with the central region having a greater length and a lesser curvature than the outer regions. Advantageously, the central region has a length which is at least twice the length of the outer regions, for example with the ratio of the lengths of the three regions 1:2.5:1. Advantageously, the central region has a curvature which is at most half the curvature of the outer regions, for example with the ratio of length to curvature of each region being substantially the same so that the angles subtended by each region are substantially the same.

Optionally each flexure 13 could be modified to consist of a group of parallel flexures to allow the suspension system 9 to be made more compliant radially of the optical axis by reducing the width of each parallel flexure. The practical limitation to this technique is the minimum width to which the parallel flexures may be manufactured.

Figure 8:
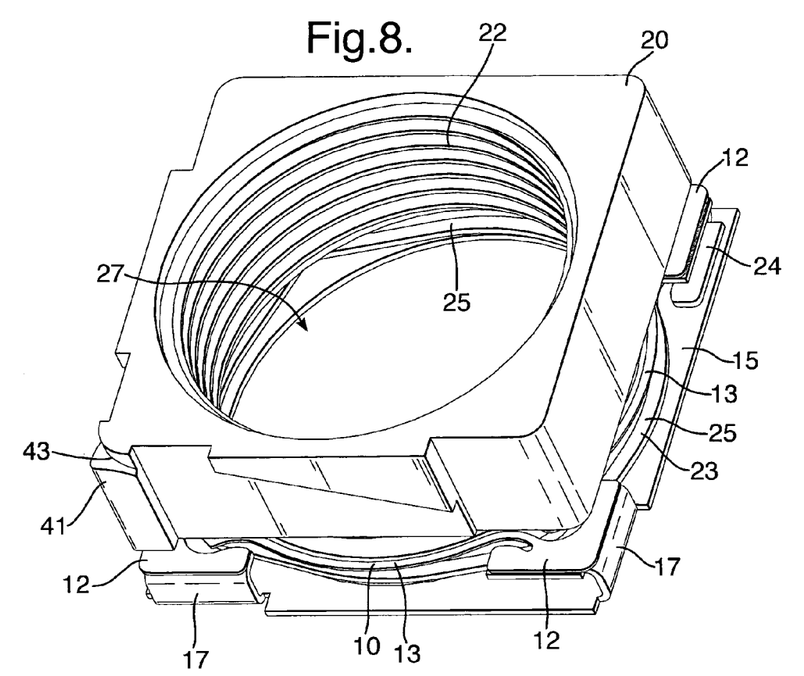

The lens carrier 20 is shown in FIG. 8 and is formed by a moulded piece of material such as a plastic. The lens carrier 20 has a generally square outer cross-section and a central aperture 27 inside which the screw thread 22 is formed. The end surface of the lens carrier 20 is connected to the inner ring 11 of the suspension element 9 in order to couple the flexures 13 to the lens element 6. The inner ring 11 and the biassing element 23 each extend around the optical axis O outside the aperture 27 to be outside the field of view of the lens element 6 without obstructing imaging on the image sensor 4.

The lens carrier 20 has a retaining element 41 integrally formed in one corner, and over which a piece of SMA wire 31 forming the SMA actuator 30 is subsequently hooked. The retaining element 41 defines a notch in which the SMA wire 31 sits and which is curved to reduce the maximum curvature of the SMA wire.

Figure 9:
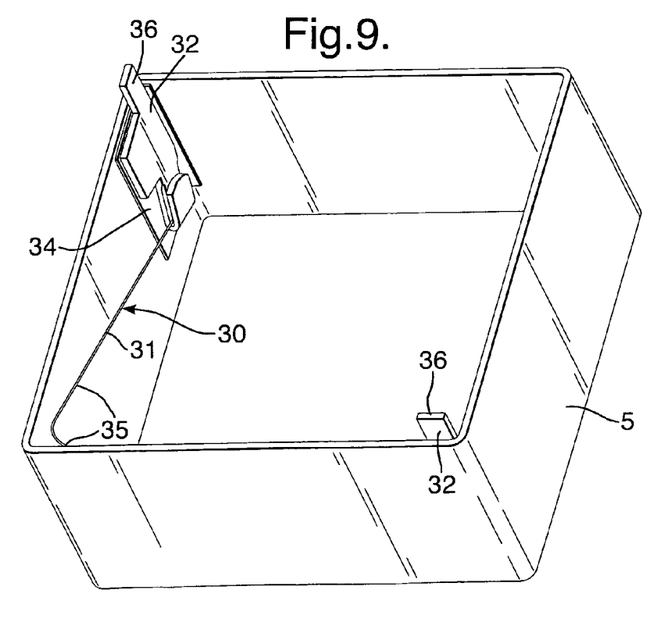

The SMA actuator 30 is shown in FIG. 9 and comprises a piece of SMA wire 31 mechanically and electrically connected at each end to a respective mounting member 32, each formed as an elongate piece of metal for example brass. In particular the mounting members 32 are each crimped over the piece of SMA wire 31 (only one mounting member 32 is fully visible in FIG. 9 but the other mounting member 32 has an identical construction). To ensure proper electrical connection, during manufacture of the SMA actuator 30 the oxide coating which forms naturally over the SMA wire 31 is removed before crimping. The mounting members 32 each also have a contact portion 36 which protrudes therefrom.

During manufacture, the SMA actuator 30 is made as a subassembly separately from the remainder of the camera 1. In particular, the SMA actuator 30 is manufactured by holding the mounting members 32 in place, applying the piece of SMA wire 31 taut over the mounting members 32 and then crimping the mounting members 32 over the piece of SMA wire 31. The SMA actuator 30 is then assembled onto the annular wall 5 of the support structure 2 which acts as a screening can and takes the form of a thin walled square metal tube. The annular wall 5 has two insulating films 34, only one of which is visible in FIG. 9, on the inside of the annular wall 5 for insulating the annular wall 5 from the mounting members 32. The two mounting members 32 are each mounted onto an insulating film 34, for example by adhesive, swaging of the wall 5 or some other means, to connect the piece of SMA wire 31 to the support structure 2. The mounting members 32 are mounted with the contact portions 36 protruding outwardly of the annular wall 5.

Figure 10:
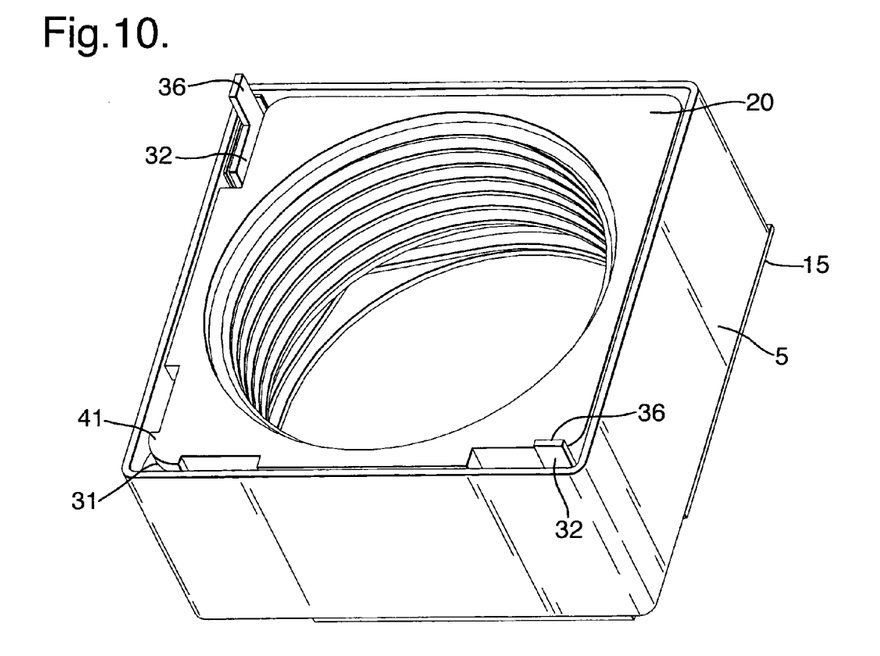

The SMA actuator 30 is then assembled as shown in FIG. 10. In particular the annular wall 5 is slid over the lens carrier 20 and the end of the annular wall 5 is mounted to the upper wall 15. In addition, the piece of SMA wire 31 is hooked over a retaining element 41 to couple the SMA actuator 30 to the lens element 6. The SMA wire 31 is held in tension but applies a lower stress than the total stress applied by the biassing element 23 and the suspension system 9.

The retaining element 41 and the ends 26 of the biassing element 23 are arranged in the same corner of the camera 1, that is at the same angular position around the optical axis O. This means the points of application of force to the lens element 6 by (a) the biassing element 23 and (b) the SMA actuator are at the same angular position around the optical axis O. This minimises the couple on the lens element 6 from these reacting loads.

Figure 11:
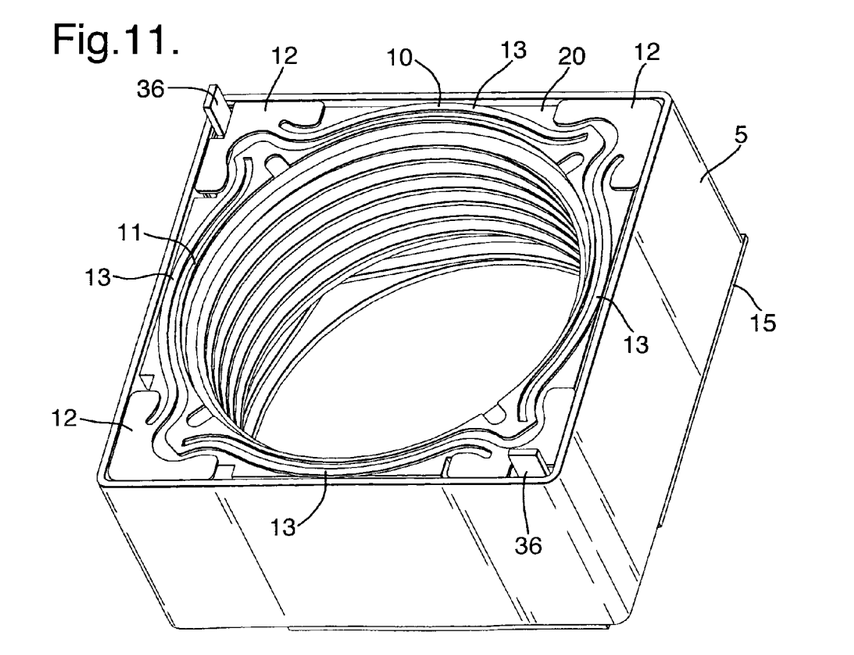

A second suspension element 10, having an identical construction to the first suspension element 10, is assembled as shown in FIG. 11. The inner ring 11 of the second suspension element 10 is connected to the end surface of the lens carrier 20 in order to couple the flexures 13 to the lens element 6.

Figure 12:
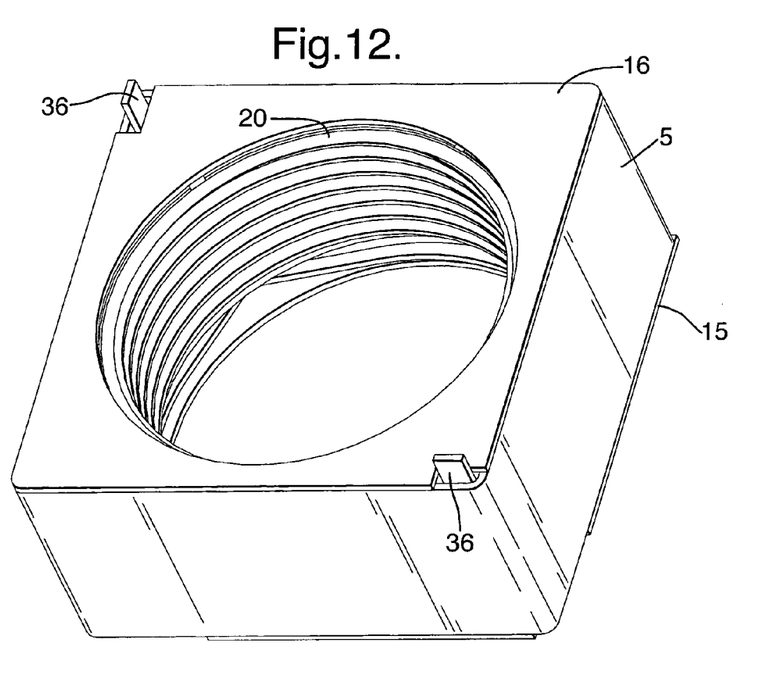

The lower wall 16 is assembled as shown in FIG. 12. In particular the lower wall 16 is mounted both to the annular wall 5 and to the four mounting plates 12 of the second suspension element 10 in order to couple the flexures 13 to the support structure 2. The contact portions 36 of the mounting members protrude outwardly through the lower wall 16.

Thus in this particular camera 1 the annular wall 5 of the support structure 2 is a thin metal external screening can inside which all the necessary components are mounted. In this way, the moving lens element 6 inside the camera 1 can be made as large as possible within the constraints of the maximum outer size. Thus, this particular camera 1 has a 6.5 mm square outer size that can accept an M5.5 threaded lens holder 21.

The assembly as shown in FIG. 12 is subsequently mounted to the base of the support structure 2 as shown in FIG. 1.

Figure 13:
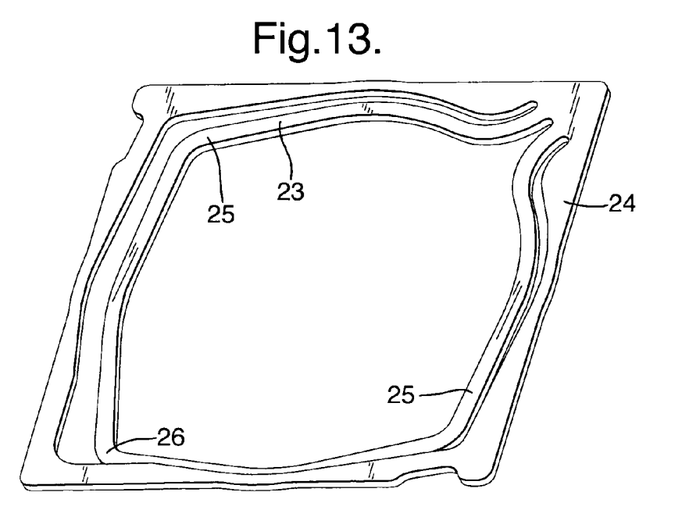
FIG. 13 is a perspective view of an alternative biassing element.

An alternative form of the biassing element 23 is shown in FIG. 13. In this alternative form, the mount 24 of the biassing element 23 is configured as a ring extending around the outside of the arms 24.

The two suspension elements 10 are arranged at opposite ends of the lens element 6 and suspend the lens element 6 on the support structure 2 by means of the flexures 13 being coupled between the lens element 6 and the support structure 2. Due to their configuration, the flexures 13 accommodate movement of the lens element 6 along the optical axis O by flexing or bending. When the lens element 6 moves along the optical axis O, the inner rings 11 move along the optical axis O relative to the outer rings 12 with consequent bending of the flexures 13.

As the flexures 13 have a thickness parallel to the optical axis O which is smaller than their width, the flexures 13 are more compliant to bending in their thickness direction than to bending in their width direction. Accordingly, the flexures 13 provide the suspension system 9 with a lower degree of stiffness against movement of the lens element 6 relative to the support structure 2 along the optical axis O, than against movement of the lens element 6 relative to the support structure 2 perpendicular to the optical axis O.

Furthermore, the two suspension elements 10 are spaced apart along the optical axis O and thus the resistance to movement of the lens element 6 perpendicular to the optical axis O also provides resistance to tilting of the lens element 6. Such resistance to off-axis movement and tilting of the lens element 6 is desirable because such off-axis movement and tilting can degrade the optical performance of the lens system 7 in focussing an image on the image sensor 4.

Within the camera 1, the mounting members 32 are positioned on diametrically opposite points around the optical axis O. The retaining element 41 is positioned mid-way between the two mounting members 32 around the optical axis O. As viewed along the optical axis, the lengths 35 of SMA wire 31 extend at 90 to each other along sides of the camera 1. After the assembly and in equilibrium, the piece of SMA wire 31 can be held in place with a small amount of adhesive, to ensure retention on the retaining elements 41 during operation or drop testing. This may be done after cycling of the SMA wire to help eliminate assembly tolerances.

The retaining element 41 is arranged at a position along the optical axis O which is closer to the image sensor 4 than the portion of the mounting members 32 to which the piece of SMA wire 31 is crimped. As a result, the two lengths 35 of SMA wire 31 formed by half of the piece of SMA wire 31 on either side of the retaining element 41 are held at an acute angle to the optical axis O. Slippage over the retaining element 41 during assembly assists in achieving an equal lengths and tensions for the two lengths 35 of SMA wire 31.

The lengths 35 of SMA wire 31 are held in tension in the camera 1 so that they apply a tensional force having a component along the optical axis O, in particular in a direction biassing the lens element 6 away from the image sensor 4. Thus in the absence of heating of the lengths 35 of SMA wire 31, the lens element 6 is in its closest position to the image sensor 4 within its range of movement. The camera 1 is designed so that this position corresponds to far-field or hyperfocal focus, which is the most common setting for the camera 1, particularly if an auto-focus function is provided.

In addition, each individual length 35 of SMA wire 31 applies a tensional force having a component perpendicular to the optical axis O. Some of the components of these forces are balanced by the symmetrical arrangement of the two lengths 35 of wire but there remains a net component of force radially of the optical axis O at the retaining element 41, this tending to tilt the lens element 6. However, the tilt is resisted by the suspension system 9 to be sufficiently small to be adequate for many lenses and image sensors.

The operation of the camera 1 to drive movement of the lens element 6 along the optical axis O relative to the support structure 2 will now be described.

SMA material has the property that on heating it undergoes a solid-state phase change which causes the SMA material to contract. At low temperatures the SMA material enters the Martensite phase. At high temperatures the SMA enters the Austenite phase which induces a deformation causing the SMA material to contract. The phase change occurs over a range of temperature due to the statistical spread of transition temperature in the SMA crystal structure. Thus heating of the lengths 35 of SMA wire 31 causes them to decrease in length.

In the camera 1, the lengths 35 of SMA wire 31 are arranged in tension providing a net tensional force along the optical axis O between the lens element 6 and the support structure 2 in the direction X moving the lens element 6 away from the image sensor 4.

This force acts against the biassing force provided by the biassing element 23 and the suspension system 9 in the opposite direction Y along the optical axis O. The biassing element 23 and the flexures 13 deflect depending on the tensional force from the lengths 35 of SMA wire 31. On flexing the biassing element 23 and the flexures 13 remain generally straight although some slight curvature may be generated. Thus the deflection of the biassing element 23 and the flexures 13 provides biassing of the lens element 6 in the direction Y.

To maximise the movement of the lens element 6 relative to the support structure 2 along the optical axis O, the total stiffness of the flexures 13 of the suspension system 9 is preferably in the range from (a) the total stiffness of the lengths 35 of SMA wire 31 experienced in the austenite phase of the SMA material to (b) the total stiffness of the lengths 35 of SMA wire 31 experienced in the martensite phase of the SMA material, more preferably the geometric mean of values (a) and (b).

It is desired that the total stiffness against movement of the lens element 6 relative to the support structure 2 along the optical axis O, provided by the sum of the stiffnesses of the biassing element 23, the flexures 13 and the lengths 35 of SMA wire 31, is sufficiently great to minimize the movement of the lens element 6 relative to the support structure 2 under gravity when the camera 1 changes between orientations. For typical lens systems the movement is desirably limited to at most 50 m which for a typical miniature camera this means that the overall stiffness should be at least 100 N/m, preferably at least 120 N/m.

The flexures 13 are designed with an appropriate width to provide the desired stiffness against movement of the lens element 6 relative to the support structure 2 in directions perpendicular to the optical axis O, based on the extent to which the lens element 7 can accommodate off-axis motion and tilting. The stiffness of the lengths 35 of SMA wire 31 may be also taken into account but usually provides a significantly smaller contribution.

Another design consideration is to ensure that the maximum stress experienced by the biassing element 23, the flexures 13 and the lengths 35 of SMA wire 31 do not over-stress the respective materials.

As discussed above, it is a particular advantage of the use of the biassing element 23 that the suspension system 9 may be designed to have a reduced stiffness, allowing a greater range of movement $\Delta x$ and/or reduced maximum stress in the suspension system 9.

The biassing element 23, on the other hand, is much easier to design without material limits being exceeded, even though the biassing element 23 has a significant stiffness. This is because the design of the biassing element 23 is not constrained in the same manner as the suspension system 9 because the biassing element 23 does not have the function of supporting and guiding movement of the lens element 6. Thus in the camera 1 the biassing element 23 has a length, as measured between the positions at which it is coupled to the support structure 2 and the lens element 6 which is greater than that of the flexures 13 of the suspension system 9. As the stiffness of a flexure scales with the cube of its length, this means that as compared to the flexures 13 it is easier to design the biassing element 23 with high stiffness but without exceeding material limits.

Although the biassing element 23 could optionally be designed with shorter arms 24, desirably in order to maintain the length the arms 24 extend a significant angle around the optical axis O, for example at least 135°.

The degree of displacement of the lens element 6 relative to the support structure 2 along the optical axis O is dependent on the stress developed within the lengths 35 of SMA wire 31 and also on the acute angle of the lengths 35 of SMA wire 31 with respect to the optical axis O. The strain which may be developed in an SMA wire is limited by the physical phenomenon of the phase change. Due to the acute angles of the lengths 35 of SMA wire 31 with respect to the optical axis O, the lengths 35 of the SMA wire change in orientation when they change in length. This effectively gears the movement so that the degree of displacement of the lens element 6 along the optical axis O is higher than the change in length of the lengths 35 of SMA resolved along the optical axis O. In general the acute angle may take any value but is approximately 70 in the example of FIG. 2.

The position of the lens element 6 relative to the support structure 2 along the optical axis O may be controlled by control of the temperature of the lengths 35 of SMA wire 31. In operation, heating of the lengths 35 of SMA wire 31 is provided by passing a current therethrough which provides resistive heating. Cooling is provided by ceasing the current and allowing the lengths 35 of SMA wire 31 to cool by conduction to their surroundings. The current is controlled by a control circuit 50 which is described further below.

The SMA wire 31 may be made of any suitable SMA material, for example Nitinol or another Titanium-alloy SMA material. Advantageously, the material composition and pre-treatment of the piece of SMA wire 31 is chosen so that the phase change, occurs over a range of temperature which is (a) above the expected ambient temperature during normal operation, typically above 70° C. and (b) as wide as possible to maximise the degree of positional control.

High speed actuation of the lens element 6 is desired in many applications, for example if an auto-focus function is provided. The speed of response of the actuation is limited by the cooling of the lengths 35 of SMA wire 31. The cooling may be speeded up by reducing the thickness of the lengths 35 of SMA wire 31. For the size of cameras and wires under consideration, the cooling time changes approximately linearly with wire diameter. For this reason, the thickness of the lengths 35 of SMA wire 31 is desirably at most 35 m to provide a response which is acceptable for an auto-focus application of the camera 1.

The nature of the control circuit 50 and the control effected thereby will now be described.

Figure 14:
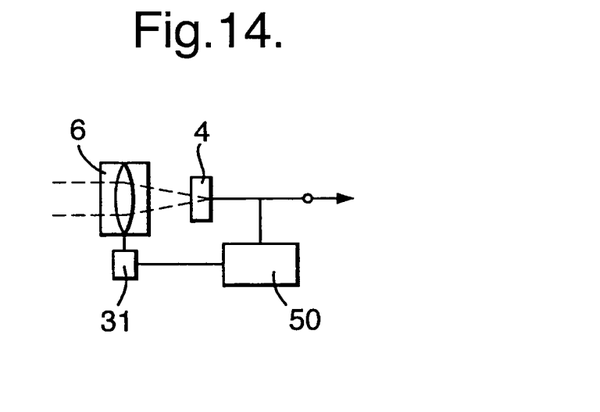
FIG. 14 is a schematic diagram of the overall control arrangement of the camera.

A schematic view of the overall control arrangement is shown in FIG. 14. The control circuit 50 is connected to the piece of SMA wire 31 and applies a current thereto to control the temperature of the piece of SMA wire 31 which moves the lens element 6 and changes the focus of the image formed on the image sensor 4. The output of the image sensor 4 is supplied to the control circuit 50 to be processed for determination of a measure of the quality of focus.

Figure 15:
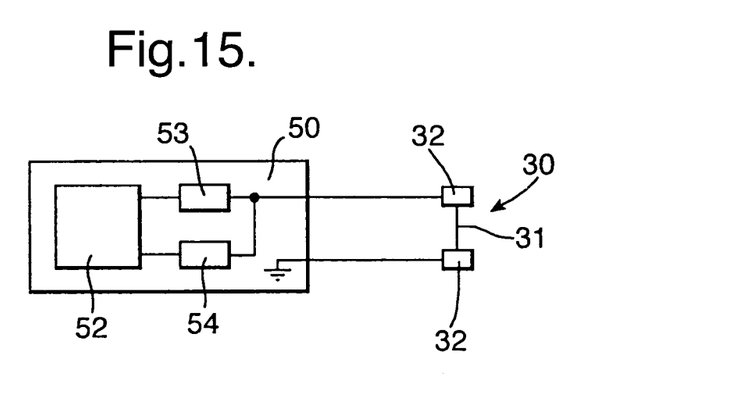
FIG. 15 is a diagram of the control circuit.

The control circuit 50 is shown in FIG. 15. The control circuit 50 is connected to each of the mounting members 32 which provide electrical connection to the piece of SMA wire 31 by means of the crimping thereof. The electrical connections 55 between the control circuit 50 and the mounting members 32 are formed by a conductive adhesive (e.g. silver-filled epoxy). It is undesirable to solder the control circuit 50 to the SMA actuator 30 because of potential damage caused by heating during the soldering process, or because of flux emissions caused by the soldering process.

The control circuit 50 supplies a current between the two mounting members 32. The control circuit 50 controls the degree of heating of the piece of SMA wire 31 by varying the power of the current flowing therethrough. The control circuit 50 varies the power of the current in response to the resistance of the piece of SMA wire 31 which is used as a measure of the position of the lens element 6. Other measures of position such as the temperature measured by a temperature sensor or a direct measure of the position of the lens element 6 output by a position sensor could be used, but a resistance sensor is advantageous because it does not increase the package size of the camera due to being implemented merely by additional components in the control circuit 50.

The physical phenomena behind the use of resistance are as follows.

On heating of the SMA, there is an increase of resistivity with temperature as for most materials. This occurs inside and outside the range of temperature over which the phase-change occurs (the phase transition range) and hence over which the SMA contracts. However inside the phase transition range two further effects occur. Firstly, the Austenite phase has a higher resistivity than the Martensite phase which tends to increase resistance with temperature. However, an opposing effect is that the change of geometry, involving a reduced length and increased cross-sectional area, tends to reduce resistance with temperature. This opposing effect is significantly greater than the other effects. Thus, during heating from low temperature, when the phase transition range is reached and the SMA starts to contract, after an initial rise of resistance the geometrical effect rapidly dominates with the result that during the major part of the contraction the resistance of the SMA actuator decreases. This occurs until the phase change has occurred in nearly all of the SMA so that the degree of contraction falls allowing the resistance to rise.

Figure 16:
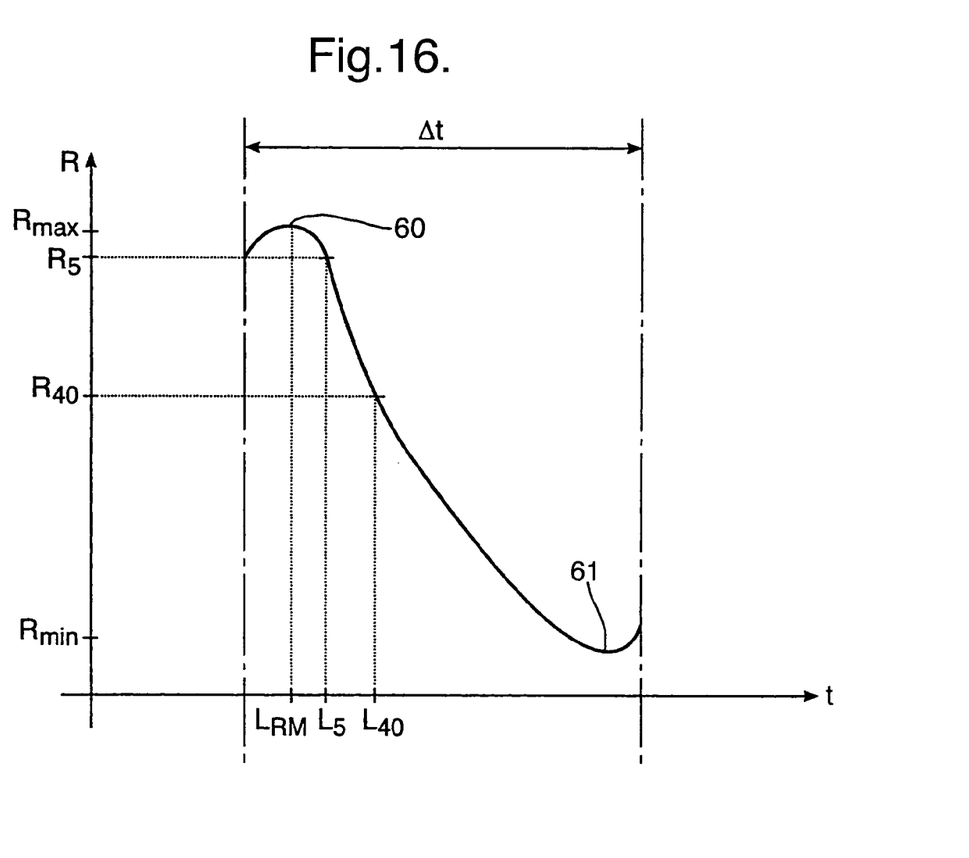
FIG. 16 is a graph of the resistance-length property of SMA during contraction.

Thus, SMA has a property that resistance varies with length during heating and contraction along a curve of the form shown in FIG. 16 which is a graph of resistance of the SMA against length of the SMA, corresponding to the position x of the lens element 6, the length increasing as the SMA contracts corresponding to increasing temperature. Thus across the phase transition range, the lens element 6 moves across a positional range $\Delta x$ due to the contraction of the SMA. The resistance rises across a small initial part of the positional range $\Delta x$ to a local maximum 60 having a resistance value Rmax. The resistance falls across the major part of the positional range $\Delta x$ to a local minimum 61 having a resistance value Rmin, whereafter the resistance rises across a small final part of the positional range x.

Due to this property of SMA material, the control circuit 50 implements control based on the measured resistance as follows. From an unheated state, the control circuit 50 heats the piece of SMA wire 31 until the local maximum resistance value is detected. This is used as an indication that contraction has started to occur. In fact a small amount of contraction has already occurred. However the local resistance maximum 60 can be easily detected, whereas the start of the positional range $\Delta x$ cannot. Accordingly, the local resistance maximum 60 is used and this is so close to the start of the positional range $\Delta x$ that the loss of movement is not significant.

Thereafter the control circuit 50 heats the piece of SMA wire 31 using the measured resistance as a measure of position. The local minimum resistance 61 is used to indicate the end of the positional range x. In fact, a small amount of contraction is still available. However the local minimum resistance 61 can be easily detected, whereas the end of the positional range $\Delta x$ cannot. Accordingly, the local minimum resistance 61 is used. This is so close to the end of the of the positional range $\Delta x$ that the loss of movement is not significant. Furthermore use of the positional range $\Delta x$ above the local minimum resistance 61 can reduce the lifetime of the piece of SMA wire 31 as described further below.

The control circuit 50 uses pulse-width modulation (PWM). In particular, the control circuit 50 applies a pulse-width modulated current pulses (which may be of constant current or constant voltage) and varies the duty cycle in order to vary the power of the current applied and hence the heating. Use of PWM provides the advantage that the amount of power supplied may be accurately controlled with a fine resolution. This method provides a high signal-to-noise ratio, even at low drive power. The PWM may be implemented using known PWM techniques. Typically, the control circuit 50 will continually supply a pulse of current, for example with a duty cycle varying in the range from 5% to 95%. When the duty cycle is at a low value within this range, the average power in the piece of SMA wire 31 is low and so the wire cools even though some current is being supplied. Conversely, when the duty cycle is at a high value in the range, the piece of SMA wire 31 heats. The resistance is measured during the current pulse, for example after a short, predetermined delay from the start of the pulse.

During heating of the piece of SMA wire 31 from a cool state below the phase transition range, the resistance varies with position in the manner shown in FIG. 16 in a manner which is consistent from sample to sample and in successive heating cycles. However, during cooling the resistance changes along a curve of similar form but the variation of resistance is less repeatable from sample to sample and there is variable hysteresis as compared to the heating. This does not prevent the use of resistance as a measure of position during cooling altogether, but does reduce the accuracy of the control. This problem is avoided by the control circuit 50 following a predetermined and repeated motion in which positional control is only effected during heating of the sample as described below.

The control circuit 50 includes the following components.

The control circuit 50 includes a drive circuit 53 which is connected to supply current to the piece of SMA wire 31. The drive circuit 53 may be a constant-voltage current source or a constant-current current source. For example, in the latter case the constant current might be of the order of 120 mA.

The control circuit 50 further includes a detection circuit 54 arranged to detect the resistance of the SMA actuator 30.

In the case that the drive circuit 53 is a constant-current current source, the detection circuit 54 may be a voltage detection circuit operable to detect the voltage across the SMA actuator 30 which is a measure of the resistance of the piece of SMA wire 31.

In the case that the drive circuit 53 is a constant-voltage current source, the detection circuit 54 may be a current detection circuit.

For a higher degree of accuracy the detection circuit 54 may comprise a voltage detection circuit and a current detection circuit operable to detect the voltage and current across the SMA actuator and to derive a measure of resistance as the ratio thereof.

A controller 52 implemented by a suitable microprocessor controls the drive circuit 53 to supply a pulse-width modulated current. The controller 52 receives the resistance measured by the detection circuit 54 and performs the PWM control in response thereto.

Figure 17:
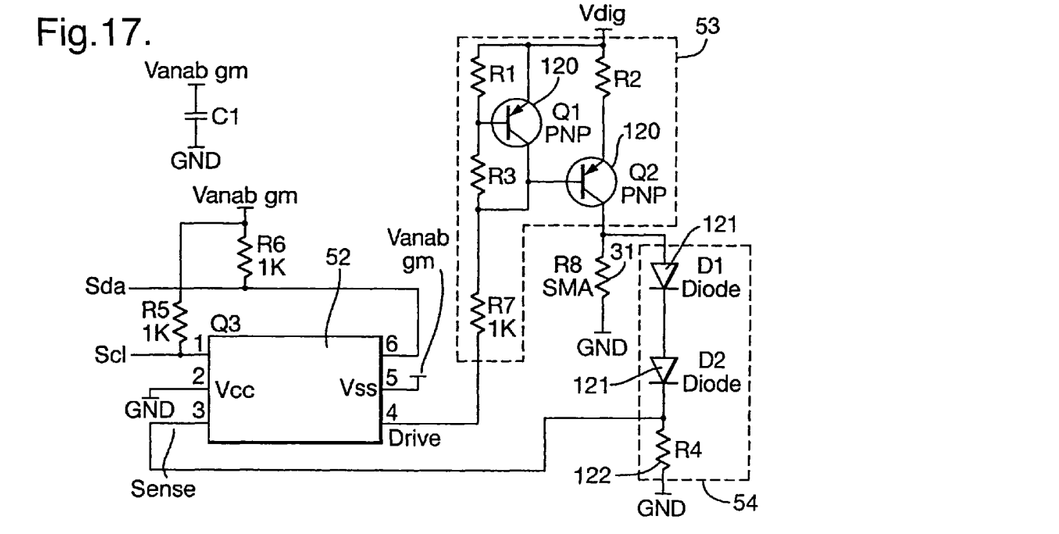
FIGS. 17 and 18 are diagrams of three possible circuit implementations for the control circuit.
Figure 18:
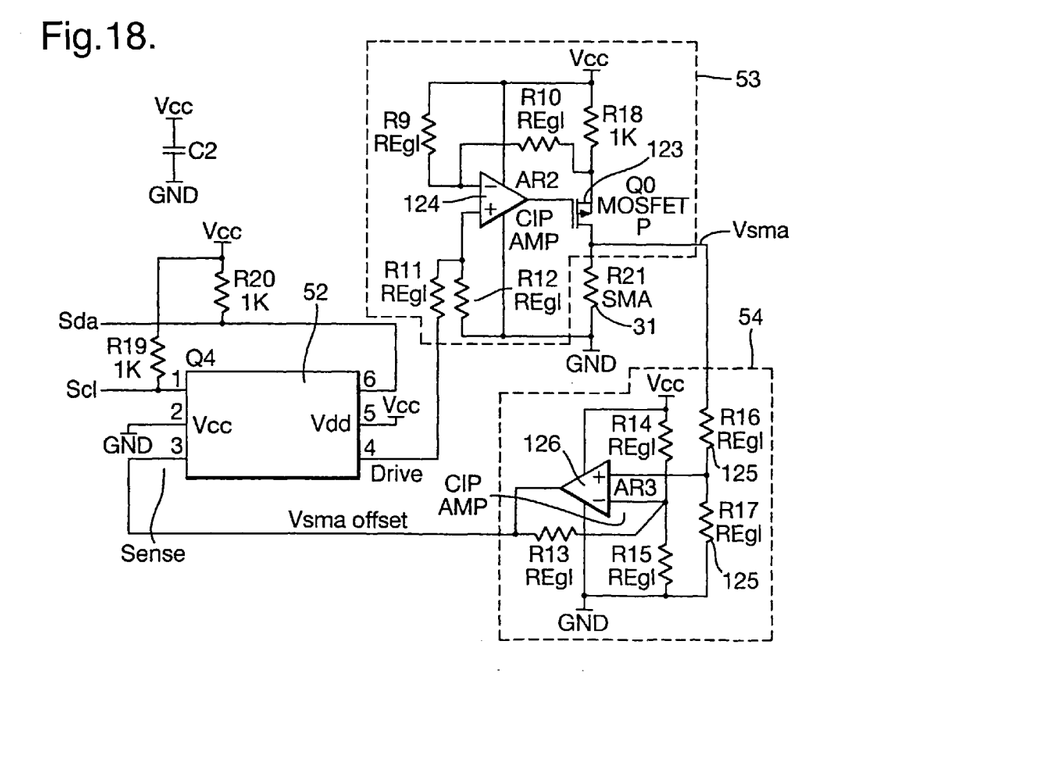

Two detailed circuit implementations for the control circuit 50 are shown in FIGS. 17 and 18.

The first circuit implementation of FIG. 17 is cheap but has limited performance. In particular, the drive circuit 53 is a constant-current current source implemented using a simple arrangement of bipolar transistors 120. The voltage detector circuit 54 is formed as a simple bridge arrangement of a pair of diodes 121 and a resistor 122.

The second circuit implementation of FIG. 18 is more accurate but is more expensive. In particular, the drive circuit 53 is a constant-current current source implemented by a MOSFET transistor 123 controlled by an operational amplifier 124. The detection circuit 125 is implemented by a bridge arrangement of two resistors 125, the output of which is amplified by an operational amplifier 126. The operational amplifier 126 allows the A/D convertor of the controller 52 to make use of its full dynamic range.

The control circuit 50 varies the power of the current using the measured resistance of the SMA actuator as a feedback signal to drive the measured resistance to a target value. In particular, the duty cycle of the pulse-width modulated current is varied. The controller 52 may implement a number of control algorithms to vary the duty cycle. One possibility is proportional control in which the duty cycle is varied by an amount proportional to the difference between the detected resistance and the target resistance. As the piece of SMA wire 31 heats across the active temperature region, the decrease in resistance is sensed and used in a feedback control technique. The stability of the feedback control is maintained by the inherent proportional-integral action of the piece of SMA wire 31 itself during heating. The overall feedback response is dominated by the response of the whole of the heating of the piece of SMA wire 31. Such a proportional control feedback loop provides for accurate control of position.

The piece of SMA wire 31 may have some non-linearities in its response. Such non-linearities may be limited by incorporating precompensation in the control circuit 50. One option is for the precompensation to consist of a gain or offset modifier on the output signal supplied to the drive circuit 53, for example based on the demand and the history of the demand signal. This is most beneficial if insufficient feedback is present to control the piece of SMA wire 31.

The control circuit 50 may implement an autofocus algorithm. In this case, the control may be based on a measure of the focus of the image, for example a modulation transfer function or a spatial frequency response, derived by the controller 52 from the image signal from the image sensor 4. A wide range of suitable measures are known and any such measure may be applied.

In this case, there is a limitation that the derivation of the measure of focus is slow. To combat this, during a scan across many focus positions, at the desired focus position determined from the measure of focus, the control circuit 50 may determine the resistance value. Then at the end of the scan the lens element 6 is driven back to the same position of the basis of that resistance value rather than the focus measure.

In this case, an image signal from the image sensor 4 is used to derive the primary feedback parameter, any drifting in the absolute values of the measure of the position as a secondary parameter over repeated cycles and age is irrelevant, as there is no perceivable change over the course of a single autofocus cycle. In a given camera 1, the resistance might vary from 10 at high temperature to 12 at low temperature, and then over the course of several 100 k cycles, this may change to 15 at high temperature and 20 at low temperature. However, for any given cycle, best focus will correspond to a specific resistance to a sufficient degree of accuracy. Thus it is only necessary to return to this specific resistance, irrespective of its absolute value.

Examples of control algorithms which may be performed by the controller 52 are described in the following applications filed by the same applicant: British Patent Application No. 0709338.8; British Patent Application No. 0718828.7; International Patent Application No. PCT/GB08/000,478 (WO-2008/099156); British Patent Application No. 0714718.4 and International Patent Application No. PCT/GB08/000,477 (WO-2008/099155), all of which are incorporated herein by reference.

Whilst the embodiments described above relate to a camera incorporating an SMA actuation arrangement which drives movement of a camera lens element, the SMA actuation arrangements described can equally be adapted to drive movement of an object other than a camera lens element.

The invention claimed is:
1. A shape memory alloy actuation apparatus comprising:
a support structure;
a movable element;
a suspension system comprising a plurality of resilient flexures coupled between the support structure and the movable element to support the movable element on the support structure and to guide movement of the movable element along a movement axis by deflection of the flexures;

a shape memory alloy actuator arranged to drive movement of the movable element relative to the support structure in a first direction along the movement axis, on contraction of the shape memory alloy actuator;

an end-stop arranged to limit the movement of the movable element in a second direction along the movement axis, opposite to the first direction;

a biassing element comprising a resilient flexure arranged to bias the movable element relative to the support structure in the second direction along the movement axis, the apparatus being arranged such that, when the moveable element is held against the end-stop, the force applied by the biassing element in said second direction is greater than the force applied by the flexures of the suspension system, the length of the resilient flexure of the biassing element, as measured between positions at which it is coupled to the support structure and the movable element, being greater than that of the plurality of resilient flexures of the suspension system.

2. A shape memory alloy actuation apparatus according to claim 1, wherein the resilient flexure of the biassing element is coupled immovably to the support structure.

3. A shape memory alloy actuation apparatus according to claim 2, wherein the resilient flexure of the biassing element engages movable element by contact without being fixed thereto.

4. A shape memory alloy actuation apparatus according to claim 1, wherein the movable element is a camera lens element, the suspension system guiding movement of the camera lens element relative to the support structure along the optical axis of the camera lens element.

5. A shape memory alloy actuation apparatus according to claim 4, wherein the camera lens element includes one or more lenses having a diameter of at most 10 mm.

6. A shape memory alloy actuation apparatus according to claim 1, wherein the shape memory alloy actuator and the resilient flexure of the biassing element engage the movable element at the same angular position around the optical axis.

7. A shape memory alloy actuation apparatus according to claim 1, wherein the resilient flexure of the biassing element has two arms each extending between the support structure and the camera lens element outside of the field of view of the camera lens element on opposite sides thereof.

8. A shape memory alloy actuation apparatus according to claim 7, wherein the two arms of the resilient flexure of the biassing element are joined together where they engage the camera lens element.

9. A shape memory alloy actuation apparatus according to claim 7, wherein the two arms of the resilient flexure of the biassing element each extend around at least 135° around the optical axis.

10. A shape memory alloy actuation apparatus according to claim 1, wherein the apparatus is arranged such that, when the moveable element is held against the end-stop, no force is applied by said plurality of flexures.

11. A shape memory alloy actuation apparatus according to claim 1, wherein the plurality of resilient flexures are arranged around the movable element.

12. A shape memory alloy actuation apparatus according to claim 11, wherein the suspension system comprises two sets of resilient flexures, each set comprising plural resilient flexures arranged around the movable element, the two sets of resilient flexures being arranged at different positions along the movement direction.

13. A shape memory alloy actuation apparatus according to claim 1, wherein the shape memory alloy actuator comprises shape memory alloy wire which is connected to the support structure and to the movable element and is in tension on contraction.

14. A shape memory alloy actuation apparatus according to claim 13, wherein the shape memory alloy wire extends at an acute angle to the movement direction of the movable element.

15. A shape memory alloy actuation apparatus according to claim 1, further comprising a further end-stop arranged to limit the opposite end of the range of movement of the movable element.

16. A shape memory alloy actuation apparatus according to claim 1, further comprising a drive circuit connected to the shape memory alloy actuator to supply a drive signal thereto.

17. A camera comprising: an image sensor; and a shape memory alloy actuation apparatus according to claim 14, the camera lens element being arranged to focus an image on the image sensor.

18. A camera according to claim 17, wherein the first direction is away from the image sensor.

* * * * *